No. 622,962. Patented Apr. 11, 1899.
F. MENZER.
VEHICLE BODY.
(Application filed Jan. 27, 1899.)
(No Model.)
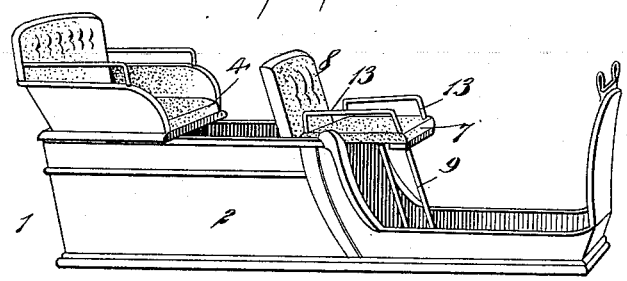
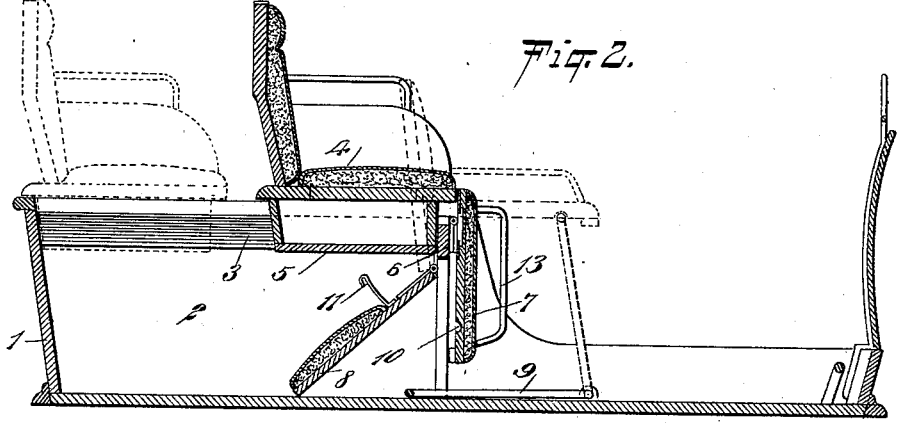
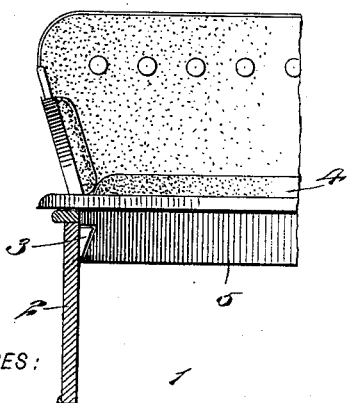
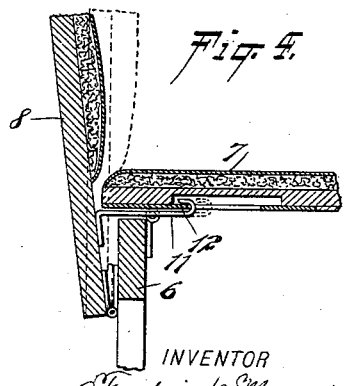
WITNESSES:
William P. Goebel
C. R. Ferguson
INVENTOR
Frederick Menzer
BY
ATTORNEYS.

UNITED STATES PATENT OFFICE.

FREDERICK MENZER, OF FLINT, MICHIGAN, ASSIGNOR OF THREE-FOURTHS TO CLARK C. HYATT, HARRY W. WATSON, AND WILLIAM WILDANGER, OF SAME PLACE.

VEHICLE-BODY.

SPECIFICATION forming part of Letters Patent No. 622,962, dated April 11, 1899.

Application filed January 27, 1899. Serial No. 703,568. (No model.)

*To all whom it may concern:*

Be it known that I, FREDERICK MENZER, of Flint, in the county of Genesee and State of Michigan, have invented a new and Improved Vehicle-Body, of which the following is a full, clear, and exact description.

This invention relates to improvements in vehicle-bodies, such as buggies, sleighs, and cutters; and the object is to provide a body so arranged that it may be easily and quickly changed from a single to a double seated vehicle or from a double to a single seat.

I will describe a vehicle-body embodying my invention and then point out the novel features in the appended claims.

Reference is to be had to the accompanying drawings, forming a part of this specification, in which similar characters of reference indicate corresponding parts in all the figures.

Figure 1 is a perspective view of a vehicle-body embodying my invention. Fig. 2 is a sectional elevation thereof. Fig. 3 is a transverse section of a portion of the body and showing a seat in elevation, and Fig. 4 is a sectional view of a portion of the second or auxiliary seat.

The body 1 of the vehicle is a box-like construction having side pieces 2, which extend from the rear end to about the center of the body. Secured to the inner sides of the side pieces 2 are guide-strips 3, upon which a seat 4 is mounted to slide. On the bottom of this seat 4 is a box-like structure 5, having channels in its ends to receive the guide-strips 3. It will be noted that these guide-strips 3 are inclined downward and outward on their inner faces, and the channels are correspondingly shaped, so that while the seat may be moved freely back and forth on the guides it cannot be lifted upward relatively to the guides. Therefore safety is assured as relates to the seat connection with the body.

Hinged to a cross-bar 6 in the vehicle-body is a supplementary seat 7, and also hinged to this cross-bar 6 or to the standards at the end thereof is a back 8 for the seat 7. A brace 9 has the lower ends of its legs pivoted to the bottom of the vehicle-body, and the cross-bar portion of this brace is designed to engage in a slot or recess 10, formed in the bottom of the seat 7, for the purpose of holding said seat 7 in position when used as a seat.

When a single-seated vehicle is desired, the brace 9 is moved down to the bottom of the vehicle, so that the seat 7 forms a drop for the seat 4 when said seat 4 is moved to its forward position, and at this time the back 8 will be swung downward into the body underneath the seat 4, all as plainly shown in Fig. 2. When a two-seated vehicle is desired, the seat 4 is to be moved back. The back 8 may then be raised and the seat 7 swung to its horizontal position, and when in this position a hook 11, extended from the lower portion of the back 8, will engage with a keeper-plate 12 on the bottom of the seat 7, after which the brace 9 is to be placed in position. It will be noted in Fig. 4 that there is a slight space between the back 8 and rear edge of the seat 7, so that said back may be moved slightly forward to disengage its hook 11 from the keeper-plate 12. Arms 13 are provided at the ends of the seat 7, and these arms may serve as hand-pieces or handles to be grasped by a person entering the vehicle when the said seat 7 is in its lowered position.

The walls of the channel 10, it is evident, will form stops to prevent the falling of the brace 9 when in position.

Having thus fully described my invention, I claim as new and desire to secure by Letters Patent—

1. A vehicle-body, a main seat movable longitudinally thereof, an auxiliary seat having swinging connection with the body, a back for the auxiliary seat also having swinging connection with the body, and means for detachably connecting the back to the auxiliary seat, substantially as specified.

2. A vehicle-body, a main seat movable longitudinally thereof, an auxiliary seat having swinging connection with the body, a back for said auxiliary seat, also having swinging connection with the body, means for detachably connecting the back to the auxiliary seat, and a support or brace for the auxiliary seat, substantially as specified.

3. A vehicle-body, a main seat movable longitudinally thereof, an auxiliary seat having hinged connection with a cross-bar in the body, a back for the auxiliary seat, mounted to swing relatively to said cross-bar, a hook on said back, a keeper on the auxiliary seat for engagement with said hook, and a brace having swinging connection with the body and adapted to engage in a channel formed on the under side of the auxiliary seat, substantially as specified.

4. A vehicle-body, a main seat mounted to slide in said body, an auxiliary seat having swinging connection with the body and adapted to form a drop for the main seat, and a back for said auxiliary seat, and mounted to swing into the body beneath the main seat independently of the auxiliary seat when said main seat is in its forward position, substantially as specified.

FREDERICK MENZER.

Witnesses:
FRANK F. WELLCHEISER,
CLARK C. HYATT.